(12) United States Patent
Kim et al.

(10) Patent No.: US 10,412,338 B2
(45) Date of Patent: Sep. 10, 2019

(54) METHOD AND APPARATUS FOR TRANSMITTING AND RECEIVING DATA BY USING HDMI

(71) Applicant: LG ELECTRONICS INC., Seoul (KR)

(72) Inventors: Dokyun Kim, Seoul (KR); Hyeonjae Lee, Seoul (KR); Jangwoong Park, Seoul (KR); Jinkwon Lim, Seoul (KR); Hyunsik Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 15/519,438

(22) PCT Filed: Oct. 14, 2015

(86) PCT No.: PCT/KR2015/010848
§ 371 (c)(1),
(2) Date: Apr. 14, 2017

(87) PCT Pub. No.: WO2016/060474
PCT Pub. Date: Apr. 21, 2016

(65) Prior Publication Data
US 2017/0244927 A1     Aug. 24, 2017

Related U.S. Application Data

(60) Provisional application No. 62/063,405, filed on Oct. 14, 2014.

(51) Int. Cl.
*H04N 9/80*     (2006.01)
*H04N 5/765*    (2006.01)
(Continued)

(52) U.S. Cl.
CPC ............ *H04N 5/765* (2013.01); *H04N 5/775* (2013.01); *H04N 7/173* (2013.01);
(Continued)

(58) Field of Classification Search
USPC .................................................. 386/248, 335
See application file for complete search history.

(56) References Cited

U.S. PATENT DOCUMENTS

| 2009/0073316 A1 | 3/2009 | Ejima |
| 2009/0316582 A1* | 12/2009 | Froelich ................. H04L 45/12 370/238 |

FOREIGN PATENT DOCUMENTS

| JP | 2010-273078 A | 12/2010 |
| JP | 2013-17106 A | 1/2013 |

(Continued)

OTHER PUBLICATIONS

HDMI Forum, "High-Definition Multimedia Interface Specification Version 2.0," Retrieved from URL:hdmiforum.org, XP055388172, Sep. 4, 2013 (Retrieved Jul. 5, 2017), pp. 1-245.
(Continued)

*Primary Examiner* — Nigar Chowdhury
(74) *Attorney, Agent, or Firm* — Birch, Stewart, Kolasch & Birch, LLP

(57) ABSTRACT

The present invention relates to a method and an apparatus for transmitting and receiving data by using high definition media interface (HDMI). According to the present invention, provided are a method including: receiving a request message for requesting first latency information indicating latency for outputting the data from a receiver, the request message including second latency information indicating the latency of the receiver; acquiring the first latency information based on at least one of the second latency information
(Continued)

and third latency information indicating the latency of the sink device; and transmitting a response message including the first latency information as a response to the request message to the receiver, and an apparatus.

10 Claims, 18 Drawing Sheets

(51) Int. Cl.

| | | |
|---|---|---|
| *H04N 7/173* | (2011.01) | |
| *H04N 5/775* | (2006.01) | |
| *H04N 21/43* | (2011.01) | |
| *H04N 21/4363* | (2011.01) | |
| *H04N 5/84* | (2006.01) | |
| *H04N 5/89* | (2006.01) | |

(52) U.S. Cl.
CPC ..... *H04N 21/4302* (2013.01); *H04N 21/4307* (2013.01); *H04N 21/43635* (2013.01)

(56) References Cited

U.S. PATENT DOCUMENTS

| | | | | |
|---|---|---|---|---|
| 2010/0067877 | A1* | 3/2010 | Ichimura | H04N 21/4307 386/239 |
| 2011/0090897 | A1* | 4/2011 | Johnson | H04H 20/30 370/350 |
| 2014/0036095 | A1* | 2/2014 | Kaehler | G06F 3/0412 348/187 |
| 2014/0160351 | A1* | 6/2014 | Ejima | H04N 5/04 348/515 |
| 2014/0259050 | A1* | 9/2014 | Goldberg | H04N 21/2368 725/32 |

FOREIGN PATENT DOCUMENTS

| | | |
|---|---|---|
| KR | 10-2010-0060717 A | 6/2010 |
| KR | 10-2010-0094335 A | 8/2010 |
| WO | WO 2006/025441 A1 | 3/2006 |

OTHER PUBLICATIONS

Lehmann et al., "Audio/Video-Delay—ein 1-15 unlbsbares Problem?," FKT Fernseh Und Kinotechnik, Fachverlag Schiele & Schon GMBH., Berlin, DE, vol. 60, No. 10, XP001550613, Oct. 1, 2006, pp. 577-579, 580-582, with an English abstract.

* cited by examiner

[FIG. 1]
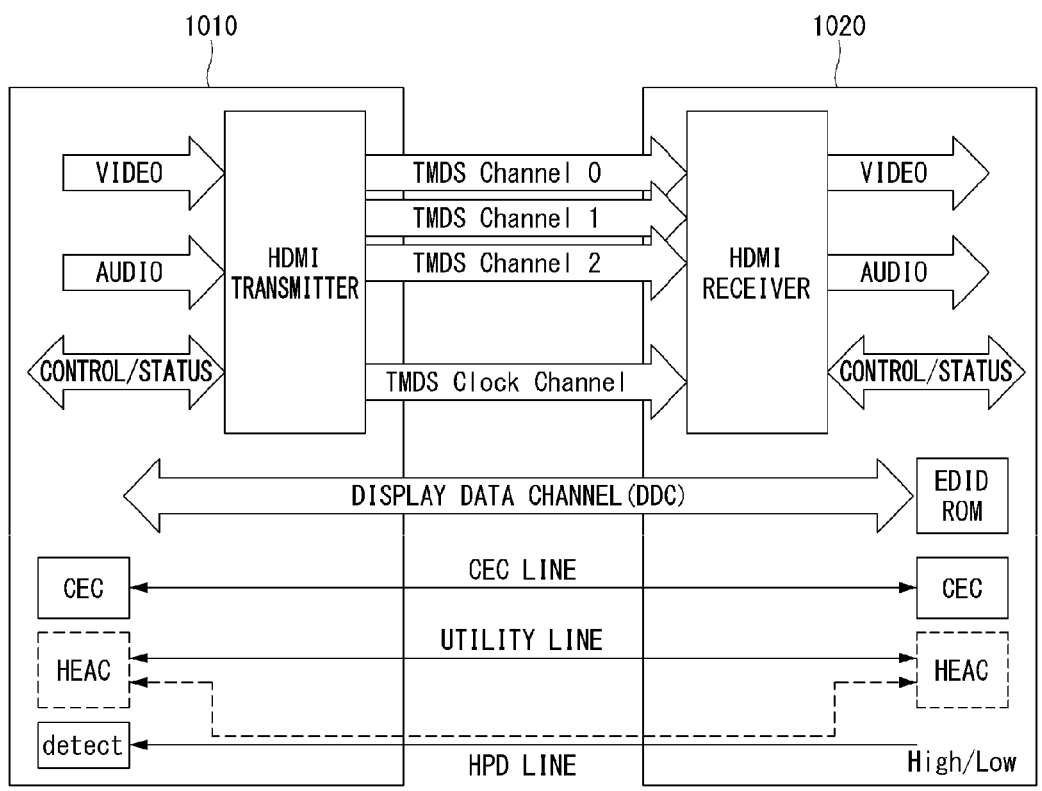

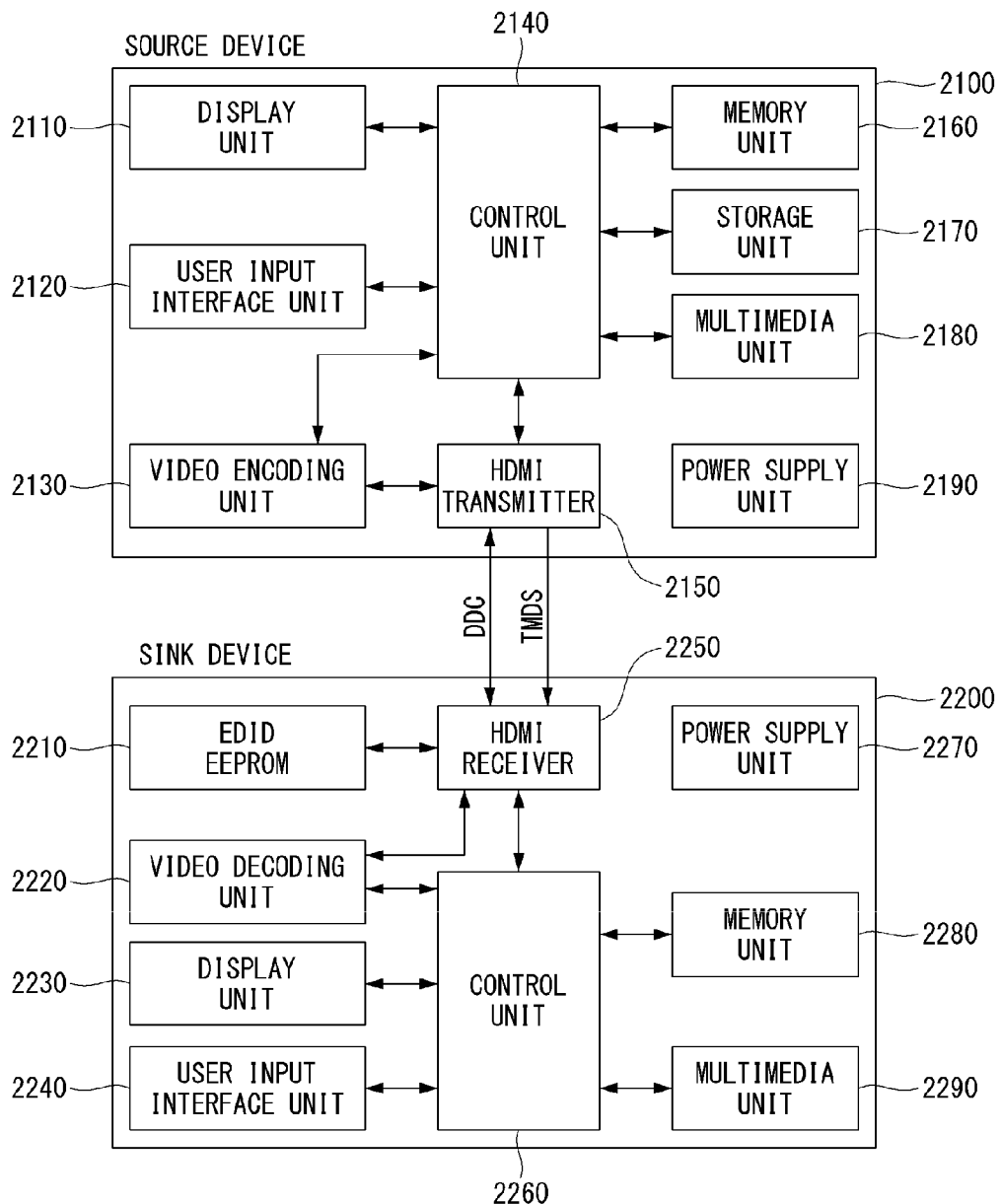

[FIG. 3]

| Address | No. Bytes | Description |
|---|---|---|
| 00h ~ 07h | 8 | Header information. Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital), Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings. Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

[FIG. 4]

| Byte # | |
|---|---|
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d-1 | End of data block collection |
| d | Start of 18-byte DTD. Follows the EDID DTD format |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

[FIG. 5]

(a) Video Data Block

| Byte # | Bits 5-7 | Bits 0-4 |
|---|---|---|
| 0 | Video Tag Code | The total number of bytes for Short Video Descriptor (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | The total number of bytes for Short Audio Descriptor (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | The total number of bytes for Speaker Allocation (L3 = 3) |
| 1~3 | Speaker Allocation Data Block Payload | |

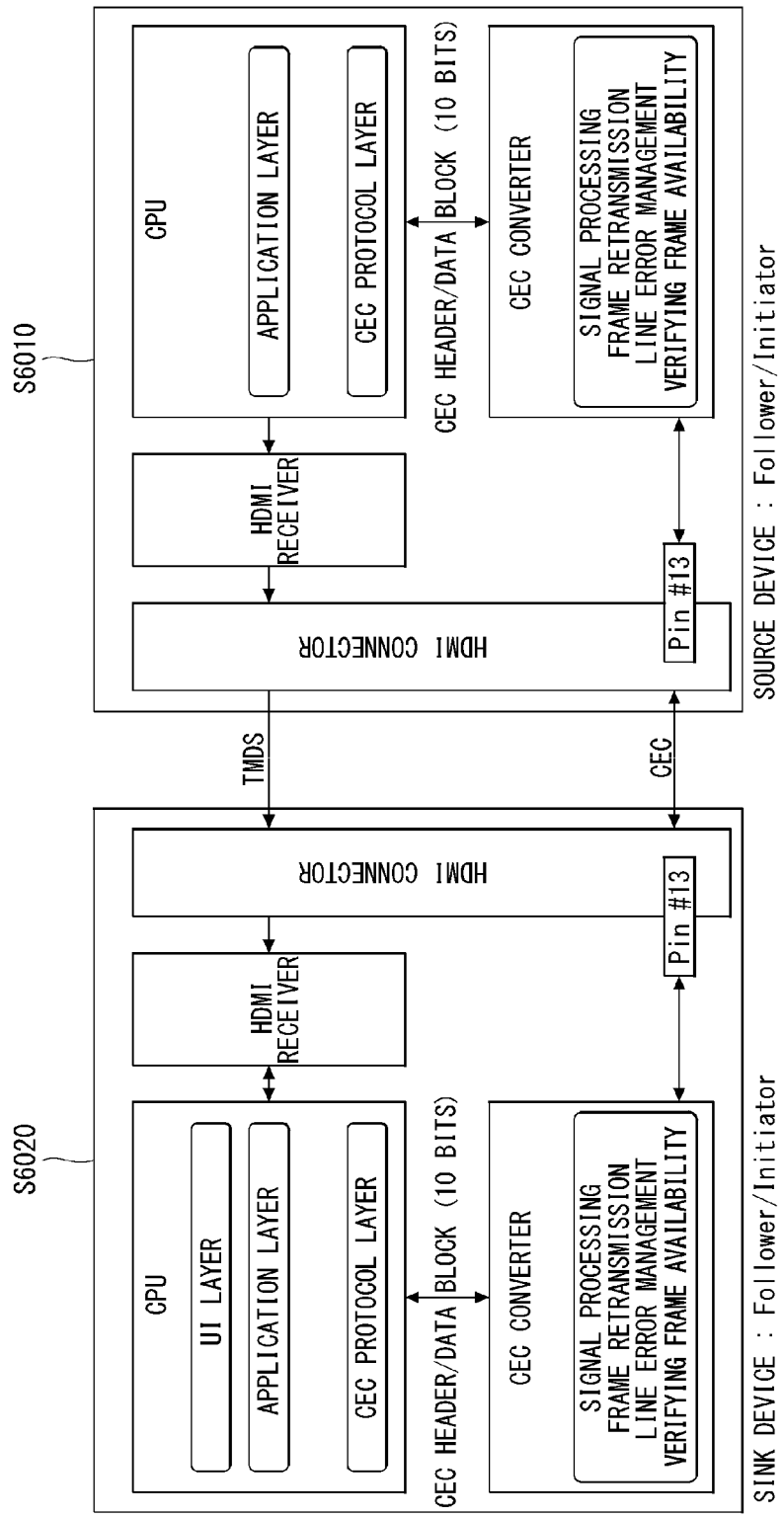
[FIG. 6]

[FIG. 7]
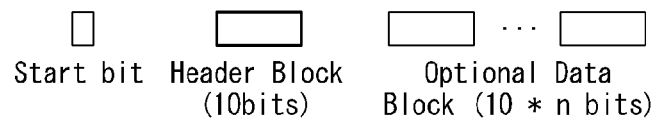
(a) CEC FRAME
| Name | Description |
|---|---|
| Start | Special Start 'bit' |
| Header Block | Source and Destination addresses (Logical Address) |
| Data Block 1 (opcode block) | Opcode(optional) |
| Data Block 2 (operand blocks) | Operand(s) specific to opcode (optional, depending on opcode) |
(b) CEC FRAME STRUCTURE
| Header/Data Block ||||||||||
|---|---|---|---|---|---|---|---|---|---|
| 7 | 6 | 5 | 4 | 3 | 2 | 1 | 0 | – | – |
| Information bits ||||||| | EOM | ACK |
(c) CEC HEADER/DATA BLOCK

[FIG. 8]
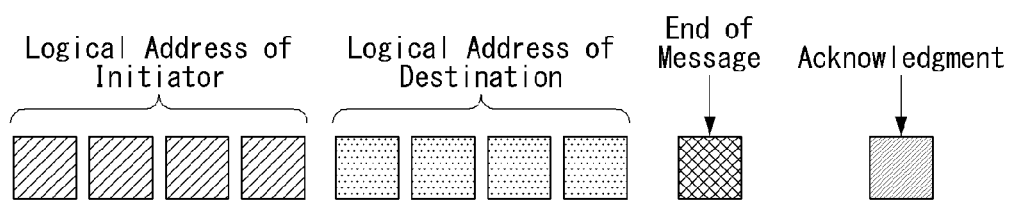
(a) CEC HEADER BLOCK
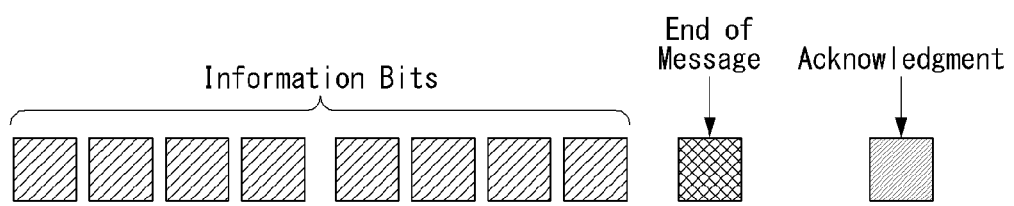
(b) CEC DATA BLOCK

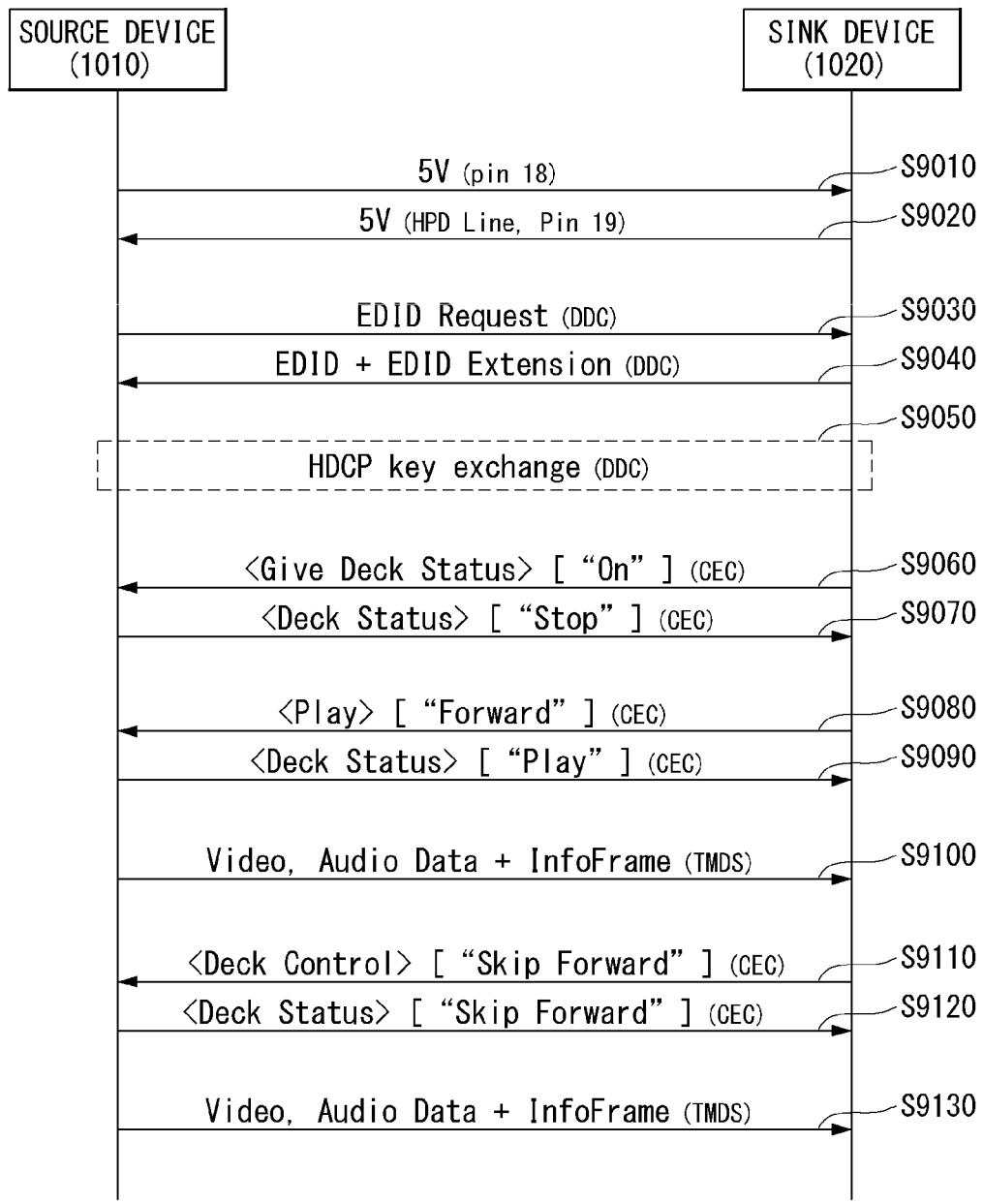

[FIG. 10]
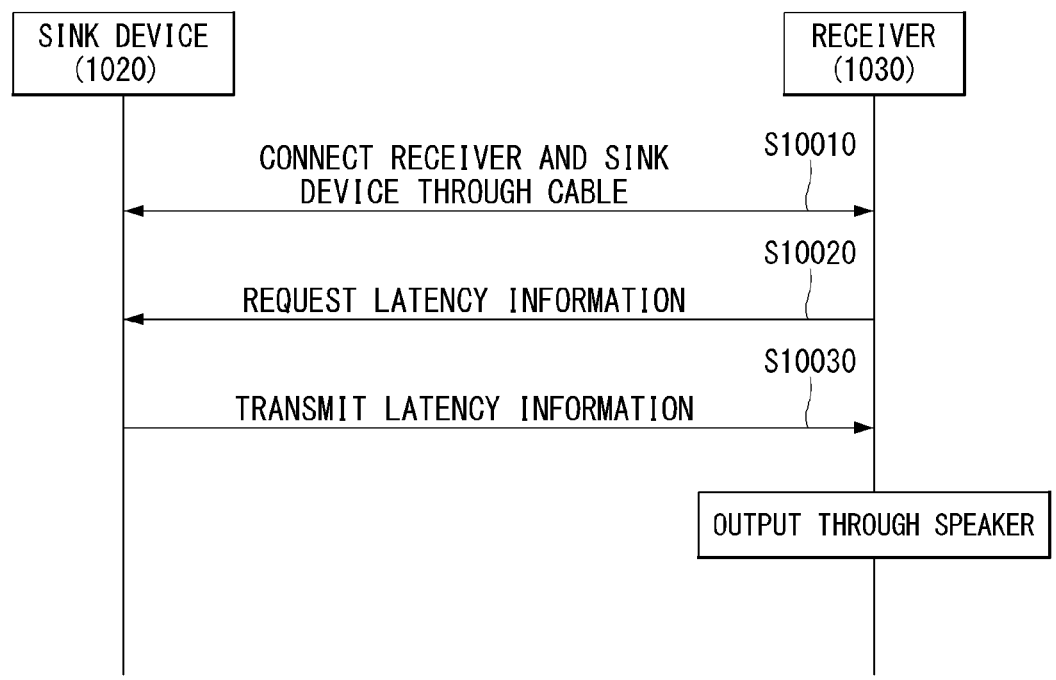

[FIG. 11]
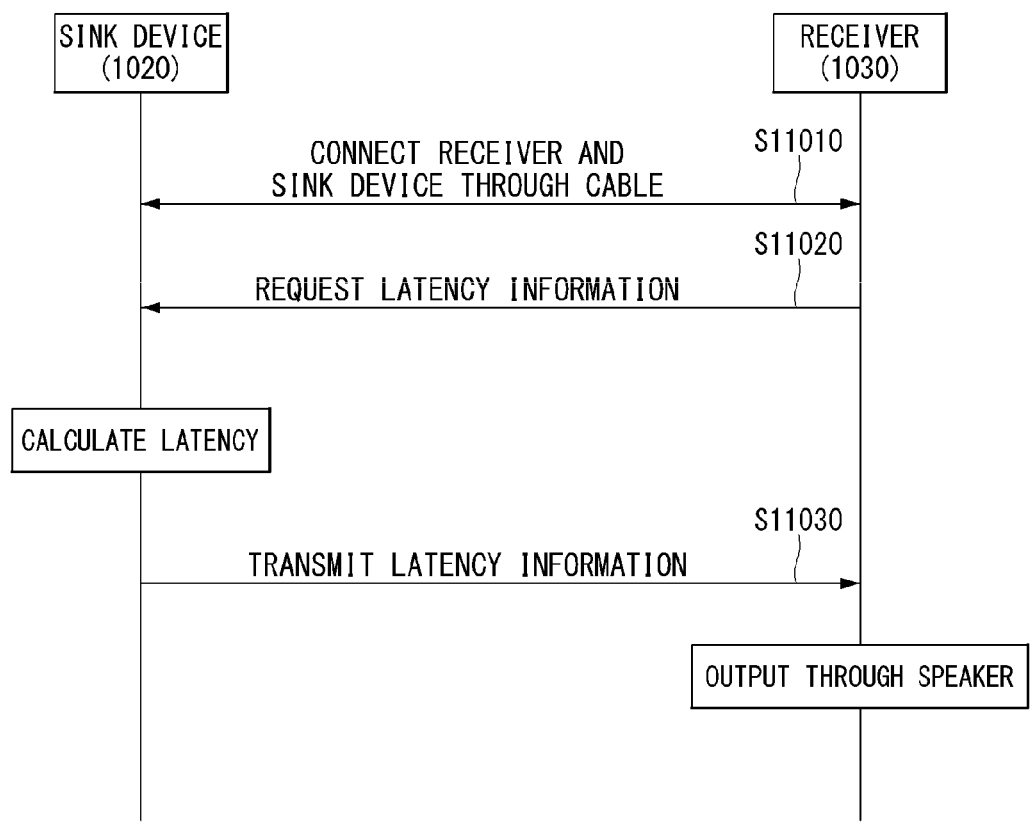

[FIG. 12]
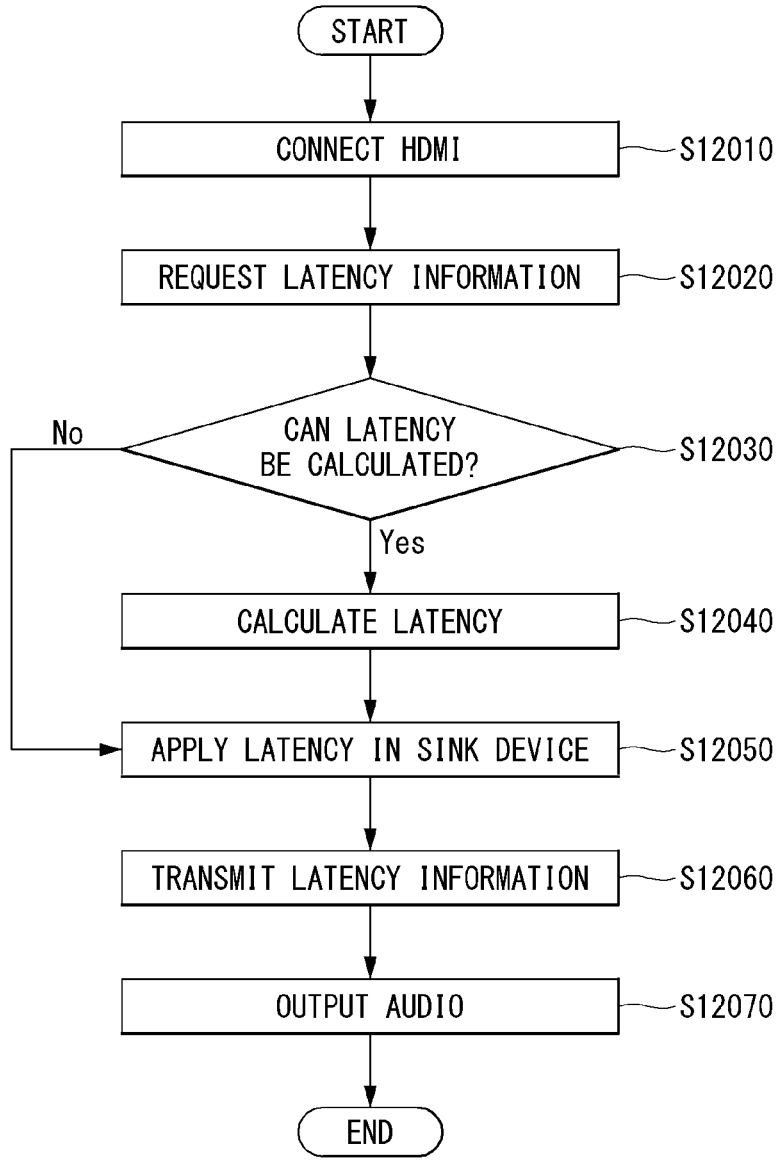

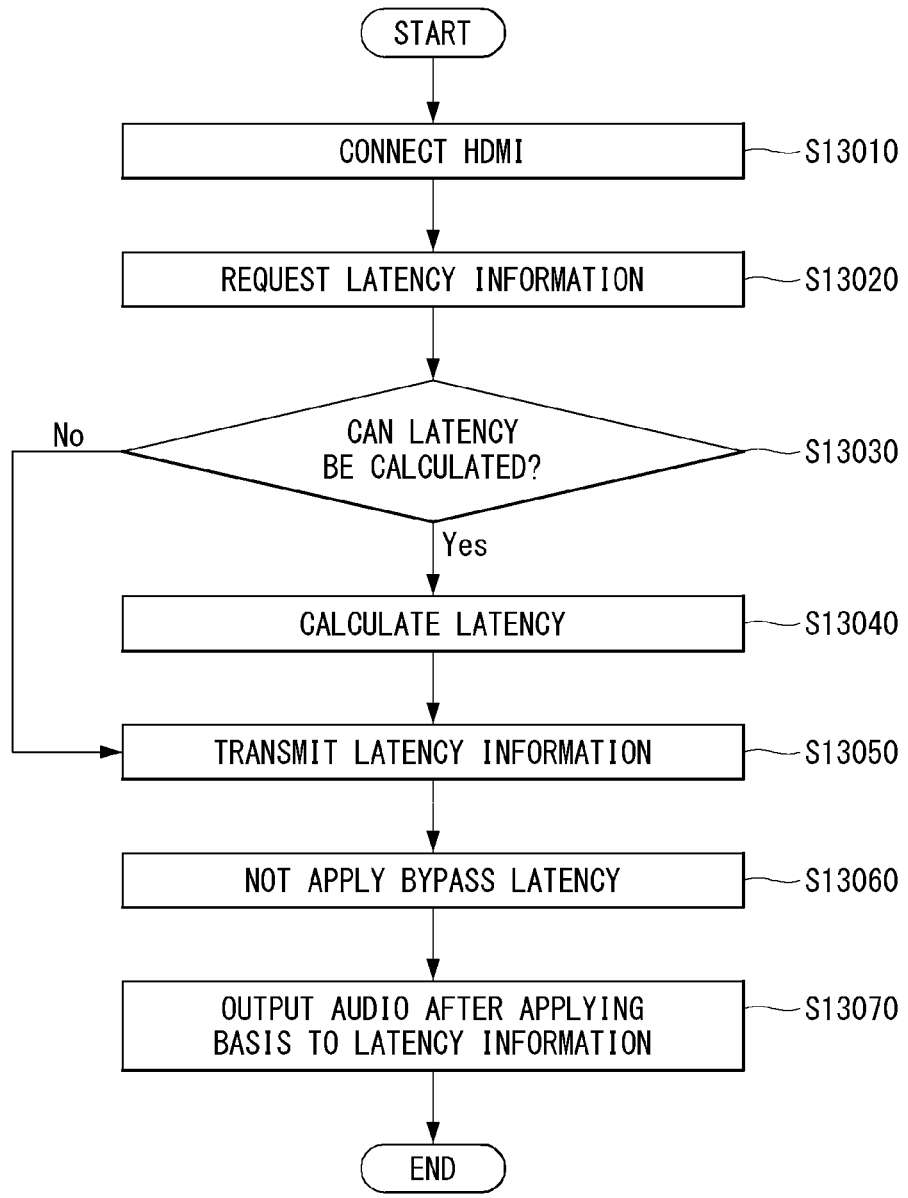
[FIG. 13]

[FIG. 14]
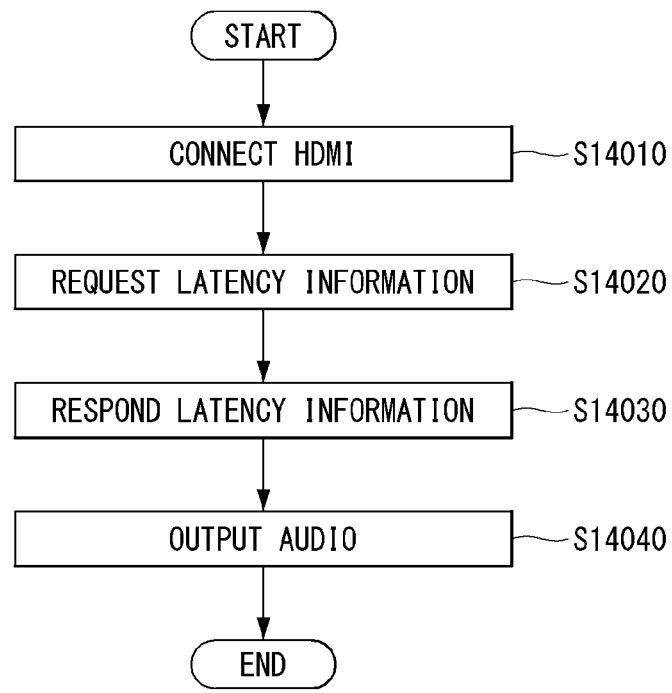

[FIG. 15]

| Opcode | value | Description | Parameters | Parameter Description | Response | Addressing | | mandatory | |
|---|---|---|---|---|---|---|---|---|---|
| | | | | | | Direct | Broadcast | Initiator | Follower |
| <Request Current Latency> | 0xA7 | Used by Amplifier (or other device) to request current latency Values | [Physical Address] | | The device at target Physical Address sends <Report Current Latency> with current values | | Yes | Amplifier Repeater Receiver | TV Repeater |
| | | | | | | | | TV | Amplifier Receiver |

[FIG. 16]

| Opcode | value | Description | Parameters | Parameter Description | Response | Addressing | | mandatory | |
|---|---|---|---|---|---|---|---|---|---|
| | | | | | | Direct | Broadcast | Initiator | Follower |
| <Report Receiver Latency> | 0x** | Used by Amplifier (or other device) to request current latency Values | [Physical Address] [Receiver Delay] [Receiver Mode On Off] | LATENCY INFORMATION OF RECEIVER CURRENTLY CONNECTED | The device at target Physical Address sends <Report Current Latency> with current values | | Yes | Amplifier Repeater Receiver | TV Repeater |

[FIG. 17]

| Name | Range Description | Length | Purpose |
|---|---|---|---|
| * Receiver Delay | 1..251; indicates the amount of audio delay in TV towards audio output (e.g. ARC, SPDIF) currently valid; coded same as latency value defined in EDID (see H14b Section 8.3.2): Value is (number of milliseconds / 2) + 1 with a minimum allowed value of 1 (indicating 0 ms) and a maximum allowed value of 251 (indicating 500 ms). Values 0 and 252..255 are reserved and shall not be used. | 1 byte | LATENCY INFORMATION OF RECEIVER |
| [Receiver Delay Mode On Off] | 0 = Receiver Latency Value None<br>1 = Receiver Latency Value Exist | 1bit | INDICATING WHETHER THERE IS LATENCY INFORMATION OF RECEIVER |

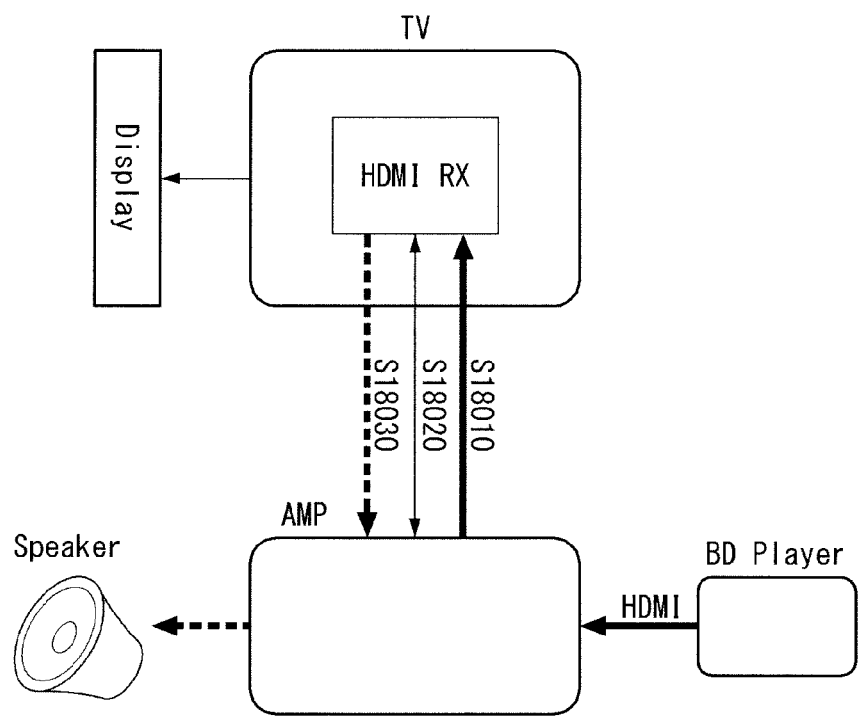
[FIG. 18]

METHOD AND APPARATUS FOR TRANSMITTING AND RECEIVING DATA BY USING HDMI

CROSS REFERENCE TO RELATED APPLICATIONS

This application is the National Phase of PCT International Application No. PCT/KR2015/010848, filed on Oct. 14, 2015, which claims priority under 35 U.S.C. 119(e) to U.S. Provisional Application No. 62/063,405, filed on Oct. 14, 2014, all of which are hereby expressly incorporated by reference into the present application.

TECHNICAL FIELD

The present invention relates to an apparatus and a method for transmitting and receiving data using high definition multimedia interface (HDMI), and particularly, to a method and an apparatus for transmitting and receiving latency information for outputting multimedia data between a receiver and a sink device.

BACKGROUND ART

HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

INVENTION CONTENT

Technical Problem

An object of the present invention is to provide a method for transmitting and receiving data between a sink device and a receiver through HDMI.

Another object of the present invention is to provide a method for the sink device and the receiver to transmit and receive latency information for outputting multimedia data through the HDMI.

Yet another object of the present invention is to provide a method and an apparatus for synchronizing the multimedia data by receiving the latency information from the receiver through the HDMI.

Still yet another object of the present invention is to provide a method and an apparatus for synchronizing video data and audio data of the multimedia data by transmitting the latency information by processing the multimedia data between devices through the HDMI.

The technical objects of the present invention are not limited to the aforementioned technical objects, and other technical objects, which are not mentioned above, will be apparently appreciated by a person having ordinary skill in the art from the following description.

Technical Solution

In order to address the problems, the present invention provides a method and an apparatus for transmitting and receiving data using high definition media interface (HDMI).

In detail, according to an embodiment of the present invention, provided is a method for transmitting and receiving data, including: receiving a request message for requesting first latency information indicating latency for outputting the data from a receiver, the request message including second latency information indicating the latency of the receiver; acquiring the first latency information based on at least one of the second latency information and third latency information indicating the latency of the sink device; and transmitting a response message including the first latency information as a response to the request message to the receiver.

Further, in the present invention, the acquiring may be performed when a mode to indicate whether the first latency information is acquired, which is previously set in the sink device is ON.

In addition, in the present invention, the method may further include receiving multimedia data from the receiver and the response message may further include a parameter indicating whether the first latency information, the second latency information, or the third latency information is applied to audio data included in the multimedia data.

Moreover, in the present invention, the method may further include transmitting the audio data to the receiver.

Further, the present invention provides a method including: transmitting a request message for requesting first latency information indicating latency for outputting the data to a sink device, the request message including second latency information indicating the latency of the receiver; and receiving a response message including the first latency information as a response to the request message from the receiver, wherein the response message is acquired based on at least one of the second latency information and third latency information indicating the latency of the sink device.

In addition, in the present invention, the method may further include transmitting multimedia data to the sink device and the response message may further include a parameter indicating whether the first latency information, the second latency information, or the third latency information is applied to audio data included in the multimedia data.

Moreover, in the present invention, the method may further include: receiving the audio data from the sink device; and outputting the audio data.

Further, the present invention provides a sink device including: an HDMI transmitter transmitting and receiving the data through the HDMI; an output unit outputting the data; and a control unit controlling the HDMI transmitter and the output unit, wherein the sink device receives a request message for requesting first latency information indicating latency for outputting the data from a receiver, in which the request message includes second latency information indicating the latency of the receiver, acquires the first latency information based on at least one of the second latency information and third latency information indicating the latency of the sink device, and transmits a response message including the first latency information as a response to the request message to the receiver.

Moreover, in the present invention, the sink device may acquire the first latency information when a mode to indicate whether the first latency information is acquired, which is previously set in the sink device is ON.

In addition, in the present invention, the sink device may receive multimedia data from the receiver, and the response message may further include a parameter indicating whether the first latency information, the second latency information, or the third latency information is applied to audio data included in the multimedia data.

Further, in the present invention, the sink device may transmit the audio data to the receiver.

Moreover, the present invention provides a receiver including: an HDMI transmitter transmitting and receiving the data through the HDMI; an output unit outputting the data; and a control unit controlling the HDMI transmitter and the output unit, wherein the receiver transmits a request message for requesting first latency information indicating latency for outputting the data to a sink device, in which the request message includes second latency information indicating the latency of the receiver, and receives a response message including the first latency information as a response to the request message from the receiver, and the response message is acquired based on at least one of the second latency information and third latency information indicating the latency of the sink device.

In addition, in the present invention, the receiver may transmit multimedia data to the sink device, and the response message may further include a parameter indicating whether the first latency information, the second latency information, or the third latency information is applied to audio data included in the multimedia data.

Advantageous Effect

By a method for transmitting and receiving data using HDMI according to an embodiment of the present invention, the data can be transmitted and received between a sink device and a receiver.

Further, according to the present invention, the sink device and the receiver can transmit and receive latency information for outputting multimedia data through the HDMI.

In addition, according to the present invention, the latency information is received from the receiver through the HDMI to accurately synchronize the multimedia data.

Moreover, according to the present invention, the latency information due to processing of the multimedia data between devices is transmitted and received through the HDMI to accurately synchronize video data and audio data of the multimedia data.

Effects which can be obtained in the present invention are not limited to the aforementioned effects and other unmentioned effects will be clearly understood by those skilled in the art from the following description.

DESCRIPTION OF DRAWINGS

FIG. 1 illustrates an HDMI system and data transmission and reception channels included in the HDMI system according to one embodiment of the present invention.

FIG. 2 illustrates a source device and a sink device in a HDMI system according to an embodiment of the present invention.

FIG. 3 illustrates an EDID structure according to an embodiment of the present invention.

FIGS. 4 to 5 illustrate an embodiment of an EDID extension block.

FIG. 6 illustrates an HDMI system using a CEC channel according to an embodiment of the present invention.

FIGS. 7 and 8 illustrate a structure of a CEC message according to an embodiment of the present invention.

FIG. 9 illustrates a method for transmitting and receiving data through HDMI according to an embodiment of the present invention.

FIG. 10 illustrates a method for transmitting and receiving latency information through the HDMI.

FIG. 11 is a flowchart illustrating the method for transmitting and receiving latency information through the HDMI according to the embodiment of the present invention.

FIG. 12 is a flowchart illustrating one example of a method for outputting multimedia data by transmitting and receiving the latency information through the HDMI according to the embodiment of the present invention.

FIG. 13 is a flowchart illustrating another example of the method for outputting multimedia data by transmitting and receiving the latency information through the HDMI according to the embodiment of the present invention.

FIG. 14 is a flowchart illustrating yet another example of the method for outputting multimedia data by transmitting and receiving the latency information through the HDMI according to the embodiment of the present invention.

FIGS. 15 to 17 illustrate one example of a CEC message format according to the embodiment of the present invention.

FIG. 18 is a diagram illustrating one example of the method for outputting multimedia data by transmitting and receiving the latency information through the HDMI according to the embodiment of the present invention.

MODE FOR INVENTION

The aforementioned objects, features and advantages of the present invention will become more apparent through the following detailed description with respect to the accompanying drawings. However, since the present invention may be modified in various ways, and various embodiments may be implemented according to the present invention, specific embodiments will be illustrated with reference to accompanying drawings and will be detailed. Hereinafter, like numbers refer to like elements throughout the specification unless otherwise stated. In describing the present invention, if it is determined that a detailed description of a known function or structure associated with the present invention unnecessarily obscures the gist of the present invention, the detailed description thereof will be omitted.

Hereinafter, a method and an apparatus related to the present invention will be described in detail with reference to the accompanying drawings. The suffixes such as 'module' and 'unit' used in the following description for referring to constituting elements of the present invention are assigned or used interchangeably merely to facilitate writing this document, and do not have specific implications or functions distinguished from each other.

FIG. 1 illustrates an HDMI system and data transmission and reception channels included in the HDMI system according to one embodiment of the present invention.

Devices that transmit and receive video/audio/control data using HDMI can be called collectively an HDMI system, and the HDMI system can comprise a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices.

In the present invention, the source device 1010 may be referred to as a receiver, a repeater, an amplifier (AMP), or the like.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out E-EDID (Enhanced Extended Display Identification Data) of the sink device in the DDC (Display Data Channel). In what follows, the E-EDID may be called EDID information.

A utility line can be used for an optional extension function such as HEAC.

FIG. 2 illustrates a source device and a sink device in a HDMI system according to an embodiment of the present invention.

In the HDMI system, the device that transmits video/audio data through HDMI corresponds to the source device 2100, and the device that receives video/audio data through HDMI corresponds to the sink device 2200.

The source device 2100 can include at least one of a display unit 2110, user input interface unit 2120, video encoding unit (video encoder) 2130, control unit 2140, HDMI transmitter 2150, memory unit 2160, storage unit 2170, multimedia unit 2180, or power supply unit 2190. The sink device 2200 can include at least one of an EDID EEPROM 2210, video decoding unit 2220, display unit 2230, user input interface unit 2240, HDMI receiver 2250, control unit 2260, power supply unit 2270, memory unit 2280, or multimedia unit 2290. In what follows, descriptions about units performing the same operation will not be repeated.

The source device 2100 represents a physical device transmitting or streaming contents stored in the storage unit to the sink device 2200. The source device 2100 can send a request message to the sink device; or receive and process a request message from the sink device. Also, the source device 2100 can provide an UI through which a response message that the sink device 2200 transmits with respect to a transmitted request message is processed and delivered to the user, and in case the source device 2100 includes the display unit 2110, the UI can be displayed.

The sink device 2200 can receive contents from the source device 2100, transmit a request message to the source device 2100, or transmit a response message by processing a message received from the source device 2100. The sink device 2200 can also provide an UI through which a response message received from the source device 2100 is processed and delivered to the user, and in case the sink device 2200 includes the display unit 2230, the UI can be displayed.

The source device 2100 and the sink device 2200 can include a user input interface unit 2120, 2240 that receives the user's action or input, and as an example, the user input interface 2120, 2240 can correspond to a remote controller, voice reception/recognition device, or touch input sensing/receiving device.

The memory unit 2160, 2280 represents a volatile physical device in which various types of data are stored temporarily.

The storage unit 2170 represents a nonvolatile physical device in which various types of data can be stored.

The EDID EEPROM 2210 represents an EEPROM that stores EDID information.

The aforementioned memory unit, storage unit, and EDID EEPROM all perform the function of storing data, which may be called collectively a memory unit.

The display unit 2110, 2230 displays data received through HDMI, data stored in a content storage, or UI on a screen according to the control of the control unit.

The multimedia unit 2180, 2290 plays various types of multimedia contents. The multimedia unit 2180, 2290 may be implemented independently of the control unit 2140, 2260 or implemented as one physical component together with the control unit.

The power supply unit 2190, 2270 supplies power required for operating a source device, sink device, and sub-units belonging to the source and sink devices.

The HDMI transmitter 2150 is the unit that is installed in the source device 2100 and transmits and receives data through HDMI. The HDMI transmitter 2150 transmits and receives data including a command between devices and a request, action, or response message as well as audio/video data.

The video encoding unit 2130 compresses video data to be transmitted through the HDMI transmitter 2150.

The HDMI receiver 2250 is the unit that is installed in the sink device 2200 and transmits and receives data through HDMI. The HDMI receiver 2250 transmits and receives data including a command between device The video decoding unit 2130 performs decompression of compressed video data received through the HDMI receiver 2250.

In what follows, channels, data structure, and functions provided by the HDMI will be described in more detail.

As described above, the HDMI system provides a DDC (Display Data Channel), which is a protocol standard defined by the VESA (Video Electronics Standard Association) specifying transmission of digital information between the monitor and the computer graphic adaptor. HDMI devices can transmit information about display modes supported by the monitor to the graphic adaptor through the DDC, and the graphic adaptor can transmit images to the monitor according to the information. Before the DDC standard is approved, the VGA standard defined four pins (Pin 11, 12, 4, and 15) of an analog VGA connector for the purpose of recognizing monitor types; among the four pins, only the pin 11, 12, and 4 have been actually used, and 7 types of monitor types could be recognized. The following provide DDC specifications for the respective versions.

DDC Version 1 (Approved in 1994)
EDID (Extended Display Identification Data) is defined, which is a binary file format specifying monitoring information.
Pin 12 is used as a data line, and an EDID block of 128 byte is transmitted consecutively from a monitor to a computer.
DDC Version 2 (Approved in 1996)
EDID is no longer defined by the DDC, but specified separately as a companion standard.
DDC version 2 is based on I2C serial bus. Pin 12 is now used as the data line, and pin 15 is used as the clock line of I2C bus.
Pin 9 is used to supply 5V DC power (up to 50 mA) from the computer to the monitor to read the EDID stored in the EEPROM even if the monitor is powered off.
DDC version 2 uses an 8 bit data offset and supports the EDID storage capacity ranging from 28 bytes to 256 bytes.
E-DDC
E-DDC replaces the DDC version 1 and 2, and version 1 was introduced in 1999. To use E-EDID (Enhanced EDID), the E-DDC allows up to 32 Kbytes of display information storage capacity.
By employing a new I2C addressing scheme based on 8-bit segment index (0x00~0x7F), 128 segments (1 segment=256 bytes) can be accessed, by which up to 32 bytes can be accessed.
E-DDC version 1.1 was approved in 2004, which supports a video interface such as HDMI in addition to CE devices and VGA.
E-DDC version 1.2 was approved in 2007, which supports display port and display ID In what follows, EDID provided through the DDC will be described.

FIG. 3 illustrates an EDID structure according to an embodiment of the present invention.

EDID is a data structure containing various types of information about the display device defined in the VESA and can be transmitted to the source device through the DDC channel or read by the source device. In the case of EDID, the data structure of version 1.3 has been used in the IT display device, CE display device, and video interface (HDMI).

FIG. 3 shows an overview of the information represented by the respective addresses in the EDID data structure.

FIGS. 4 to 5 illustrate an embodiment of an EDID extension block.

FIG. 4 illustrates an EDID extension block, FIG. 5(*a*) a video data block, FIG. 5(*b*) an audio data block, and FIG. 5(*c*) a speaker allocation data block.

Timing information specified in the EDID is intended for IT display devices and can use the EDID 1.3 extension block defined in the CEA-861 to represent the timing information of CE display devices. The version 3 CEA extension block is defined in the CEA-861B standard and specifies four optional data blocks (video, audio, speaker allocation, and vendor-specific data block).

In the video data block of FIG. 5(*a*), the short video descriptor represents the video identification code defined in the CEA-861. In the audio data block of FIG. 5(*b*), the short audio descriptor represents the audio format code defined in the CEA-861. In the speaker allocation data block of FIG. 5(*c*), the speaker allocation data block descriptor represents the data block payload defined in the CEA-861.

FIG. 6 illustrates an HF (HDMI Forum)-VSDB (Vendor-Specific Data Block) according to an embodiment of the present invention.

The HF-VSDB shown in FIG. 6 is the data block that defines vendor-specific data, where HDMI can define HDMI-specific data by using the data block. The HF-VSDB can be included in the E-EDID of the sink device, and in that case, it can be positioned at CEA extension version 3 within the E-EDID of the sink device.

The fields included in the HF-VSDB of FIG. 6 are described as follows.

Length field: represents the total length of the data block, of which the minimum value is 7, and the maximum value is 31.
IEEE OUI field: refers to IEEE Organizationally Unique Identifier, and the OUI assigned to the HDMI forum is 0xC45DD8.
Version field: represents the version number of the HF-VSDB (HDMI Forum-VSDB), of which the value is 1.
Max_TMDS_Character_Rate field: represents the maximum TMDS character rate supported. If the sink device does not support the maximum TMDS character rate more than 340 Mcsc, it is set to 0; otherwise, it is set to 1.
3D_OSD_Disparity: when this field is set to 1, it indicates that the sink device supports reception of 3D_OSD_Disparity Indication.
Dual_view: when this field is set to 1, it indicates that the sink device supports reception of dual_view signaling.
Independent_view field: when this field is set to 1, it indicates that the sink device supports reception of 3D independent view signaling.
LTE_340Mcsc_scramble field: when this field is set to 1, it indicates that the sink device supports scrambling when the TMDS character rate is less than 340 Mcsc. And when the SCDC_Present is set to 0, this field also has to be set to 0.
RR_Capable field: when this field is set to 1, it indicates that the sink device can initiate an SCDC read request. And if the SCDC_Present is set to 0, this field also has to be set to 0.
SCDC_Present field: when this field is set to 1, it indicates that the sink device supports the SCDC function.
DC_48 bit_420, DC_36 bit_420, DC_30 bit_420: when these fields are set to 1, it indicates that deep color 4:2:0 pixel encoding is supported by 10 bit/12 bit/16 bit per component.

The present invention is capable of signaling decompression capability information of the sink device through an HF-VSDB of the EDID, which will be described later.

FIGS. 7 and 8 illustrate a structure of a CEC message according to an embodiment of the present invention.

As described above, the CEC enables the user to control a CEC-enabled device connected through HDMI by using a remote controller. When connected to each other through HDMI, physical addresses are assigned to the respective devices, and logical addresses are additionally assigned to CEC-enabled devices.

Each individual device may exchange messages through a CEC line at the occurrence of an event, and each message may be used to perform the following functions.

One Touch Play: play of a device is started by one click of a button, and the device enters an active source state.

Routing Control: controls routing of an HDMI network when a CEC switch is being used.

System Standby: switches all the connected devices to a standby mode.

One Touch Record: controls a function of recording the contents played in TV.

Preset Transfer: transfers a channel setting to a different TV set.

Timer Programming: programs a timer of a different device from one device.

System Information: sets a device to use the same OSD and a menu language as TV.

Deck Control: controls a play device from a different device.

Tuner Control: controls a tuner of a different device.

OSD display: transfer text so that a device may display the screen shown in a TV set.

Device OSD Name Transfer: transfers a predetermined device name to a TV set.

Device Menu Control: enables a TV remote controller to control menus of a device.

Remote Control Pass Through: transfers what has been received from a remote controller to a different device.

Vendor Specific Commands: commands defined by a manufacturer.

A CEC message may be transmitted through a CEC frame, and a CEC frame may comprise a start bit, a header block, a first data block, and a second data block as shown in FIG. 9.

The size of each block is 10 bits, and the size of the largest message excluding the start bit is 16*10 bits.

As shown in FIGS. 7(c) and 8, the header block may include address of a source device and destination address, the first data block may comprise an opcode block, and the second data block may comprise an operand block. At this time, an opcode may denote the name used for identifying a message.

Each data block and header block may comprise an information bits field, EOM (End Of Message) field, and ACK field.

The information bits field may include data, opcode, or address. The EOM (End Of Message) field indicates the last block of a message; for example, if the EOM field is 0, it indicates existence of one or more data blocks while, if the EOM field is 1, it indicates that a message is completed. Even if a message contains additional data after the EOM field is transmitted, a device has to ignore the additional data.

The ACK field is sent by being set to '1' by the initiator, and the follower indicates reception of a message by setting the ACK field to '0'.

FIG. 9 illustrates a method for transmitting and receiving data through HDMI according to an embodiment of the present invention.

If the source device 1010 and the sink device 1020 are connected to each other through an HDMI cable, the source device 1010 changes the power line from low level to high level and applies a current (S9010). Subsequent to the aforementioned operation, the source device 1010 may operate the EEPROM in which EDID information of the sink device 1020 is stored and related circuit.

The sink device 1020 switches the HPD (Hot Plug Detect) line from low to high level to inform the source device 1010 of the fact that a cable has been connected properly and EDID information may be accessible as EDID-related circuit has been activated (S9020).

Afterwards, the source device 1010 may transmit an EDID information read request to the sink device 1020 through DDC (S9030). In response to the EDID read request, the sink device 1020 may transmit the EDID information stored in the EEPROM through the DDC (S9040). In the embodiment of the present invention, the EDID information may be transmitted being included in the aforementioned VSDB.

The source device 1010 and the sink device 1020 perform an encryption protocol according to a HDCP (High-bandwidth Digital Content Protection) key exchange procedure through the DDC (S9050).

The sink device 1020 transmits <Give Deck Status> ["on"] message to the source device 1020, which is a CEC message for turning on the deck of the sink device 1010 (S9060). By turning on the deck and transmitting a <Deck Status> message, the source device 1020 may inform the sink device 1010 of the deck status of the source device 1020 (S9070).

Afterwards, if the sink device 1010 receives a command for playing A/V data from the user, the sink device 1010 may make the source device 1020 play A/V data by transmitting <Play> through the CEC (S9080). By transmitting a <Deck Status>["Play"] message to the sink device 1020 through the CEC, the source device may inform that the deck of the source device 1010 is being played (S9090).

Afterwards, the source device 1010 may transmit video data, audio data, and infoframe to the sink device 1020 through the TMDS (S9100). Receiving a specific command, for example, Next Chapter command from the user, the sink device 1010 may make the source device 1010 skip the current chapter by transmitting a <Dec Control>["Skip Forward"] message through the CEC (S9110). The source device 1010 which has skipped the current chapter may report the deck status by transmitting a <Deck Status>["Skip Forward"] message (S9120).

Afterwards, the source device may transmit video data, audio data and/or infoframe to the sink device 1010 through the TDMS (S9130).

FIG. 10 illustrates a method for transmitting and receiving latency information through the HDMI.

Referring to FIG. 10, a receiver 1030 may receive latency information from the sink device 1020 in order to synchronize the multimedia data.

In detail, when the receiver 1030 and the sink device 1020 are connected to each other through the HDMI (S10010), the receiver 1030 may reproduce audio data included in the multimedia data through a speaker by considering a time required for the sink device 1020 to reproduce video data included in the multimedia data.

To this end, the receiver 1030 may request the latency information indicating a processing time of the video data to the sink device 1020 (S10020).

The sink device 1020 may transmit the latency information to the receiver 1030 when a value of "Audio Output Compensated" which is a parameter indicating whether the latency information is applied to the audio data included in the multimedia data is '1' or '2' (S10030).

The "Audio Output Compensated" may be set by the sink device 1020 and may have the following values.

'0'=N/A

'1'=Audio output is delay compensated

'2'=Audio output is not delay compensated

'3'=Audio output is partially delayed

Thereafter, the receiver 1030 may receive the audio data and the latency information from the sink device 1020 (S10030) and reproduce the audio data through the speaker.

In this case, since a latency time is applied due to processing of the video data of the sink device 1020 when the value of "Audio Output Compensated" is '1', the receiver 1030 does not apply the value of the latency information to the audio data but output the value of the latency information.

However, since the latency time is not applied due to the processing of the video data of the sink device 1020 when the value of "Audio Output Compensated" is '1', the receiver 1030 applies the value of the latency information to the audio data and outputs the value of the latency information.

Since the multimedia data is reproduced without considering latency which occurs from the receiver 1030 when the multimedia data is reproduced through such a method, the video data and the audio data may not synchronized with each other. For example, when a latency margin is short and the latency margin thus exists throughout the threshold, the video data and the audio data may be output while not synchronizing with each other.

Therefore, in order to address such a problem, the present invention proposes a method for reproducing data by considering the latency of the sink device and the latency which occurs from the receiver.

FIG. 11 is a flowchart illustrating the method for transmitting and receiving latency information through the HDMI according to the embodiment of the present invention.

Referring to FIG. 11, the receiver 1030 may transmit the latency information thereof to the sink device 1020 in order to synchronize the multimedia data. The sink device 1020 may receive whole latency information from the sink device 1020 by considering the latency information of the receiver 1030 and the latency information of the sink device 1020.

In detail, when the receiver 1030 and the sink device 1020 are connected to each other through the HDMI (S11010), the receiver 1030 may reproduce the audio data included in the multimedia data through the speaker by considering the time required for the sink device 1020 to reproduce the video data included in the multimedia data.

To this end, the receiver 1030 may transmit a request message for requesting latency information (first latency information) indicating the latency in reproducing the video data and the audio data to the sink device 1020 (S11020).

In this case, the receiver 1030 may transmit second latency information indicating the latency which occurs from the receiver and 'Physical Address' of the sink device 1020 included in the request message.

When the sink device 1020 intends to transmit a response message to the receiver 1030 by setting the "Audio Output Compensated" which is the parameter illustrated in FIG. 10 to '1' or '2', the sink device 1020 may calculate a value of the first latency information from a value of the second latency information and a value of third latency information indicating the latency of the sink device.

Thereafter, the sink device 1020 may transmit the response message to the receiver 1030 as a response to the request message (S11030).

The response message may include the first latency information, the "Audio Output Compensated" parameter, and the 'Physical Address' of the sink device.

Thereafter, the receiver 1030 may receive the audio data and the first latency information from the sink device 1020 (S10030) and reproduce the audio data through the speaker.

In this case, when the value of the "Audio Output Compensated" is '1', '1' indicates that the value of the first latency information is applied to the audio data, and as a result, the receiver 1030 does not apply the value of the first latency information to the audio data but outputs the value of the first latency information.

However, when the value of the "Audio Output Compensated" is '1', '1' indicates that the value of the first latency information is not applied to the audio data, and as a result, the receiver 1030 applies the value of the first latency information to the audio data and outputs the value of the first latency information.

Since the receiver 1030 and the sink device 1020 may reproduce the audio data and the video data by considering the latency which occurs from the receiver 1030, there is an effect that the audio data and the video data may accurately synchronize with each other.

FIG. 12 is a flowchart illustrating one example of a method for outputting multimedia data by transmitting and receiving the latency information through the HDMI according to the embodiment of the present invention.

Referring to FIG. 12, the sink device and the receiver reproduce the multimedia data by considering the latency which occurs by each device to accurately synchronize the video data and the audio data with each other.

First, since steps S12010 and S12020 are the same as steps S11010 and S11020, a description thereof will be omitted.

The sink device verifies whether a mode indicating whether the value of the first latency information is calculated, which is previously set in the sink device is ON or OFF (S12030) and when the mode is ON, the sink device calculates the value of the first latency information (S12040) and when the mode is OFF, the sink device may not calculate the value of the first latency information.

Therefore, when the value of the first latency information is calculated, the sink device may apply the value of the first latency information to the audio data and when the value of the first latency information is not calculated, the sink device may apply only the value of the third delay information indicating the delay of the sink device to the audio data without considering the value of the second latency information (S12050).

Therefore, the sink device may transmit the response message including the audio data and the first latency information or the third latency information to the receiver as the response to the request message (S12060).

Since the value of the first latency information or the value of the second latency information is already applied to the audio data, the receiver that receives the response message may output the audio data without applying an additional latency value (S12070).

FIG. 13 is a flowchart illustrating another example of the method for outputting multimedia data by transmitting and receiving the latency information through the HDMI according to the embodiment of the present invention.

Referring to FIG. 13, the sink device does not apply the value of the latency information to the audio data, but transmits the value of the latency information to the receiver and the receiver applies the value of the latency information to the audio data and outputs the value of the latency information unlike FIG. 12.

First, since steps S13010 to S13040 are the same as steps S12010 to S12040 of FIG. 12, the description thereof will be omitted.

Thereafter, the sink device transmits the response message including the audio data and the first latency information or the third latency information to the receiver without applying the value of the first latency information or the value of the third latency information to the audio data (S13050 and S13060).

Since the value of the first latency information or the value of the third latency information is not applied to the audio data, the receiver that receives the response message may output the audio data by applying the value of the first latency information or the value of the third latency information to the audio data (S13070).

FIG. 14 is a flowchart illustrating yet another example of the method for outputting multimedia data by transmitting and receiving the latency information through the HDMI according to the embodiment of the present invention.

Referring to FIG. 14, a sink device may calculate latency values generated from the receiver and the sink device and transmit the calculated latency values to the receiver and the receiver may output multimedia data based on the received latency values.

First, since steps S14010 to S14020 are the same as steps S12010 to S12020 of FIG. 12, the description thereof will be omitted.

The sink device may acquire the first latency information from the second latency information received from the receiver and the third latency information indicating the latency of the sink device and transmit the response message including the acquired first latency information and the audio data to the receiver (S14030).

In this case, the sink device may apply the value of the first latency information to the audio data or not apply the value of the first latency information to the audio data.

Thereafter, when the value of the first latency information is applied to the audio data received from the sink device, the receiver may immediately output the audio data and when the value of the first latency information is not applied to the audio data, the receiver may apply the value of the first latency information to the audio data and output the value of the first latency information (S14040).

FIGS. 15 to 17 illustrate one example of a CEC message format according to the embodiment of the present invention.

In the embodiment of FIGS. 11 to 14, the message transmitted and received by the sink device and the receiver may be a CEC message transmitted through the aforementioned CEC. In the CEC message, an operator may represent a command to transmit a CEC command, opcode may represent a name for identifying the CEC message, and operand may represent data values corresponding to the CEC command/message. In particular, the operand may correspond to data corresponding to specific opcode.

FIG. 15 is a diagram illustrating a CEC message format for the request message. The opcode of the request message as <Request Current Latency> is used for requesting the latency information to the sink device.

FIG. 16 is a diagram illustrating the CEC message format for the response message. The opcode of the request message as <Report Receiver Latency> is used for transmitting the latency information to the receiver.

The CEC message defined in FIGS. 15 and 16 is defined by describing the corresponding operation and not particularly defined as the same syntax.

FIG. 17 illustrates one example of operand defined in the present invention and the operand defined in the present invention is described with reference to FIG. 17.

[Receiver Delay]
Operand used for transmitting the latency information of the receiver

[Receiver Delay Mode]
Operand used for indicating whether there is the latency information of the receiver When the operand is '0', '0' indicates OFF and indicates that there is no latency information of the receiver.

When the operand is '1', '1' indicates ON and indicates that there is the latency information of the receiver.

FIG. 18 is a diagram illustrating one example of the method for outputting multimedia data by transmitting and receiving the latency information through the HDMI according to the embodiment of the present invention.

Referring to FIG. 18, the receiver and the sink device may reproduce the multimedia data by applying the latency which occurs while processing the multimedia data.

First, when an amplifier (AMP) receives the multimedia data from a BD player through the HDMI, the AMP transmits the multimedia data to a TV which is the sink device (S18010).

The AMP may request the latency information (first latency information) for reproducing the multimedia data to the TV through the CEC message and transmit the latency information (second latency information) of the AMP to the TV together during the request (S18020).

When the TV sets the "Audio Output Compensated" value which is the aforementioned parameter to '1' or '2', the TV may calculate the first latency information based on the second latency information and the latency information (third latency information) of the TV.

For example, when the value of the second latency information is 20 ms and the value of the third latency information is 100 ms, the value of the first latency information becomes 80 ms.

Thereafter, the TV may apply the video data included in the multimedia data to the value of the first latency information and output the video data through a display unit and transmit the audio data included in the first latency information, the "Audio Output Compensated", and the multimedia data to the AMP through the CEC message (S18030).

When the value of the "Audio Output Compensated" is '1', the value of the first latency information is applied to the audio data, and as a result, the AMP may not apply an additional latency value to the audio data, but output the audio data through the speaker.

However, when the value of the "Audio Output Compensated" is '2', the value of the first latency information is not applied to the audio data, and as a result, the AMP may apply the first latency value to the audio data and output the audio data through the speaker.

The aforementioned present invention is not limited to the aforementioned embodiments and the accompanying drawings, and it will be obvious to those skilled in the technical field to which the present invention pertains that various substitutions, modifications, and changes may be made within the scope without departing from the technical spirit of the present invention.

INDUSTRIAL APPLICABILITY

The present invention is used in series of HDMI fields.

It is apparent to an ordinary skilled person in the art that various modifications and changes may be made without departing from the spirit and scope of the present invention. Accordingly, the present invention is intended to include the modifications and changes of the present invention within the attached claims and the equivalent scope.

The invention claimed is:

1. A method for transmitting and receiving data of a sink device using high definition media interface (HDMI), the method comprising:
   receiving, from a source device, a message including first latency information related to audio latency of the source device and a request for second latency information related to video latency of the sink device;
   obtaining, by the sink device, third latency information based on the first latency information and the second latency information;
   applying a value of the third latency information to an audio data; and
   transmitting, to the source device, the audio data with the value applied.

2. The method of claim 1, wherein the obtaining the third latency information comprises:
   calculating a difference between a value of the first latency information and a value of the second latency information.

3. The method of claim 2, wherein the first latency information comprises 1 byte information indicating latency for an audio data represented in milliseconds.

4. The method of claim 1, wherein the obtaining the third latency information is performed when a mode indicating whether the first latency information is acquired, which is predefined in the sink device, is ON.

5. The method of claim 1, wherein the message is a Consumer Electronics Control (CEC) message transmitted via a CEC protocol.

6. A sink device for transmitting and receiving data using high definition media interface (HDMI), the sink device comprising:
   an HDMI transmitter configured to transmit and receive the data through the HDMI;
   an output unit configured to output the data; and
   a control unit configured to control the HDMI transmitter and the output unit,
   wherein the sink device is configured to:
      receive, from a source device, a message including first latency information related to audio latency of the source device and a request for second latency information related to video latency of the sink device,
      obtain third latency information based on the first latency information and the second latency information,
      apply a value of the third latency information to an audio data, and
      transmit, to the source device, the audio data with the value applied.

7. The sink device of claim 6, wherein the sink device calculates a difference between a value of the first latency information and a value of the second latency information to obtain the third latency information.

8. The sink device of claim 6, wherein the first latency information comprises 1 byte information indicating latency for an audio data represented in milliseconds.

9. The sink device of claim 6, wherein the third latency information is obtained when a mode indicating whether the first latency information is acquired, which is predefined in the sink device, is ON.

10. The sink device of claim 6, wherein the message is a Consumer Electronics Control (CEC) message transmitted via a CEC protocol.

* * * * *